United States Patent
Choi et al.

(10) Patent No.: US 11,046,821 B2
(45) Date of Patent: Jun. 29, 2021

(54) EMULSION PARTICLE, EMULSION COMPRISING SAME, METHOD FOR MANUFACTURING EMULSION

(71) Applicant: HANWHA CHEMICAL CORPORATION, Seoul (KR)

(72) Inventors: Jeong Hyun Choi, Daejeon (KR); Hee Yun Kim, Daejeon (KR); Tae Hoon Yeum, Daejeon (KR); Su Jin Lee, Daejeon (KR); Dae Won Cho, Seoul (KR)

(73) Assignee: Hanwha Chemical Corporation, Seoul (KR)

( * ) Notice: Subject to any disclaimer, the term of this patent is extended or adjusted under 35 U.S.C. 154(b) by 9 days.

(21) Appl. No.: 16/476,057

(22) PCT Filed: Dec. 29, 2017

(86) PCT No.: PCT/KR2017/015776
§ 371 (c)(1),
(2) Date: Jul. 3, 2019

(87) PCT Pub. No.: WO2018/128336
PCT Pub. Date: Jul. 12, 2018

(65) Prior Publication Data
US 2019/0330427 A1 Oct. 31, 2019

(30) Foreign Application Priority Data
Jan. 4, 2017 (KR) .......................... 10-2017-0001150

(51) Int. Cl.
| C08J 3/18 | (2006.01) |
| C08J 3/16 | (2006.01) |
| C08J 3/12 | (2006.01) |
| C08L 25/14 | (2006.01) |
| C08L 33/08 | (2006.01) |
| C08L 33/10 | (2006.01) |

(52) U.S. Cl.
CPC ............. C08J 3/16 (2013.01); C08J 3/126 (2013.01); C08L 25/14 (2013.01); C08L 33/08 (2013.01); C08L 33/10 (2013.01); C08J 2325/06 (2013.01); C08J 2333/08 (2013.01); C08J 2333/10 (2013.01); C08L 2207/53 (2013.01)

(58) Field of Classification Search
CPC . C08J 3/16; C08J 3/126; C08J 2325/06; C08J 2333/08; C08J 2333/10; C08J 3/03; C08L 25/14; C08L 33/08; C08L 33/10; C08L 2207/53; C08L 7/02; C08L 9/10; C08L 21/02; C08L 2312/00; C09D 5/022; C09D 133/062; C09D 125/14; C08F 2/22; C08F 285/00; C08F 265/06; C08F 220/14; C08F 2/24
USPC ........................................................ 523/201
See application file for complete search history.

(56) References Cited

U.S. PATENT DOCUMENTS

| 5,639,805 A * | 6/1997 | Park ...................... C08F 265/06 523/201 |
| 10,954,370 B2 * | 3/2021 | Kim ........................ C08L 25/14 |
| 2005/0209410 A1 * | 9/2005 | Bromm .................... C08F 8/14 525/327.7 |
| 2019/0352493 A1 * | 11/2019 | Kim ........................ C09D 5/024 |
| 2019/0367741 A1 * | 12/2019 | Cho ....................... C09D 133/06 |

FOREIGN PATENT DOCUMENTS

| DE | 102005033516 A1 | 1/2007 |
| JP | 08169919 | 7/1996 |
| JP | 2005-171253 A | 6/2005 |
| JP | 2009-062507 A | 3/2009 |
| JP | 2010180398 | 8/2010 |
| KR | 10-2001-0066310 A | 7/2001 |
| KR | 10-2012-0067319 A | 6/2012 |
| KR | 10-2016-0008418 A | 1/2016 |
| WO | 2018/128336 | 7/2018 |

OTHER PUBLICATIONS

Machine Translation of JP 2005-171253. (Year: 2005).*
Wu et al., "Alkali Soluble Resins (ASR) and acrylic blends: influence of ASR distribution and latex film and paint purposes", Journal of coating technology and research, Published Jul. 1, 2016. (Year: 2016).*
European Patent Office, Extended European Search Report for PCT Application No. PCT/KR2017/015776, dated Jul. 28, 2020. 6 pages.
Korean Intellectual Property Office, International Search Report for PCT Application No. PCT/KR2017/015776, dated Mar. 30, 2018. 2 pages.
Japan Intellectual Property Office, First Office Action for Application No. JP 2019-535285, dated Aug. 18, 2020. 6 pages.

* cited by examiner

*Primary Examiner* — Hannah J Pak
(74) *Attorney, Agent, or Firm* — Socal IP Law Group LLP; Jonathan Pearce (57) ABSTRACT

An emulsion particle, an emulsion including the same, and a method of manufacturing an emulsion are provided. The emulsion particle includes: a core derived from a polymer of an unsaturated ethylenic monomer and including a first sub core and a second sub core surrounding the first sub core; and a shell surrounding the core and including an alkali-soluble resin, wherein the first sub core includes a polymer having a first glass transition temperature, and the second sub core includes a polymer having a second glass transition temperature lower than the first glass transition temperature.

6 Claims, 3 Drawing Sheets

EMULSION PARTICLE, EMULSION COMPRISING SAME, METHOD FOR MANUFACTURING EMULSION

This application claims priority to International PCT Application No. PCT/KR2017/015776, filed Dec. 29, 2017, entitled "EMULSION PARTICLE, EMULSION COMPRISING SAME, METHOD FOR MANUFACTURING EMULSION" which claims priority to Korean Patent Application No.: 10-2017-0001150 filed Jan. 4, 2017, the disclosures and figures of which are incorporated by reference as if set forth herein in their entirety.

BACKGROUND

Technical Field

The present invention relates to an emulsion particle, an emulsion including the emulsion particle, and a method of manufacturing the emulsion. More particularly, the present invention relates to a styrene/acrylic emulsion particle having a core-shell structure, an emulsion including the emulsion particle, and a method of manufacturing the emulsion.

DISCLOSURE

Technical Problem

As a method of manufacturing a styrene/acrylic emulsion, which is one of water-based resins, there is exemplified a method of emulsion-polymerizing unsaturated ethylenic monomers using an alkali-soluble resin as an emulsifier.

However, in the case of a general styrene/acrylic emulsion, there is a limitation that durability and film properties have an inverse relationship. For example, when the glass transition temperature of the emulsion is increased in order to improve durability such as hardness, the adhesion to a substrate may be deteriorated, or a coating film may not be formed. In contrast, when the glass transition temperature of the emulsion is lowered in order to improve coating properties, there is a problem that durability such as hardness, water resistance or chemical resistance may be deteriorated.

An aspect of the present invention is to provide an emulsion particle having both improved film properties and durability that have been difficult to be compatible with each other in the prior art.

Another aspect of the present invention is to provide an emulsion having both improved film properties and durability.

Still another aspect of the present invention is to provide a method of manufacturing an emulsion having both improved film properties and durability.

However, the technical scope of the present invention is not limited to the aforementioned objects, and other unmentioned object can be clearly understood by those skilled in the art from the following descriptions.

Technical Solution

According to an aspect of the present invention, there is provided an emulsion particle, including: a core derived from a polymer of unsaturated ethylenic monomers and including a first sub core and a second sub core surrounding the first sub core; and a shell surrounding the core and including an alkali-soluble resin, wherein the first sub core includes a polymer having a first glass transition temperature, and the second sub core includes a polymer having a second glass transition temperature lower than the first glass transition temperature.

The shell may include a resin having a third glass transition temperature higher than the second glass transition temperature.

Also, the first glass transition temperature may be 55° C. to 100° C., and the second glass transition temperature may be −60° C. to −10° C.

Also, a weight ratio of the polymer constituting the first sub core and the polymer constituting the second sub core may be 50:50 to 80:20.

Also, the degree of cross-linking of the polymer constituting the first sub core may be lower than the degree of cross-linking of the polymer constituting the second sub core.

Also, the core may further include a third sub core surrounding the second sub core, and the third sub core includes a polymer having a fourth glass transition temperature higher than the second glass transition temperature.

Also, the fourth glass transition temperature may be 55° C. to 100° C.

According to another aspect of the present invention, there is provided an emulsion, including: a dispersion medium; and styrene/acrylic emulsion particles dispersed in the dispersion medium, wherein each of the emulsion particles includes: a core derived from a polymer of unsaturated ethylenic monomers and including a first sub core and a second sub core surrounding the first sub core, and a shell surrounding the core and including an alkali-soluble resin.

A content of the emulsion particles may be 60 wt % or less with respect to a total weight of the emulsion, the emulsion may have a glass transition temperature of 25° C. to 55° C., and the emulsion may have an acid value of 100 mgKOH/g or less.

According to the other aspect of the present invention, there is provided a method of manufacturing an emulsion, including: preparing an alkaline aqueous medium in which an alkali-soluble resin is dissolved; adding a first monomer mixture to the alkaline aqueous medium; and adding a second monomer mixture, whose composition is different from a composition of the first monomer mixture, to the alkaline aqueous medium provided with the first monomer mixture.

A polymer formed by polymerizing the first monomer mixture may have a first glass transition temperature, and a polymer formed by polymerizing the second monomer mixture may have a second glass transition temperature lower than the first glass transition temperature.

Also, the alkali-soluble resin may have a weight average molecular weight of 5,000 g/mol to 30,000 g/mol, a glass transition temperature of 30° C. to 120° C., and an acid value of 70 mgKOH/g to 180 mgKOH/g.

Also, the second glass transition temperature may be lower than the glass transition temperature of the alkali-soluble resin.

Also, the first monomer mixture may include 80 wt % to 85 wt % of styrene and 13 wt % to 17 wt % of methyl methacrylate, with respect to a total weight of the first monomer mixture, and the second monomer mixture may include 80 wt % to 85 wt % of ethylhexyl acrylate, 13 wt % to 17 wt % of methyl methacrylate, and 1.0 wt % to 5.0 wt % of glycidyl methacrylate, with respect to a total weight of the second monomer mixture.

Also, the polymer formed by polymerizing the first monomer mixture may constitute a first sub core of an emulsion particle, and the polymer formed by polymerizing the second monomer mixture may constitute a second sub core surrounding the first sub core of the emulsion particle.

Polymerization of at least a part of the first monomer mixture may be completed before adding the second monomer mixture.

Also, each of the addition of the first monomer mixture and the addition of the second monomer mixture is continuously performed for 60 minutes to 180 minutes.

Also, the first monomer mixture may be added in an amount of 50 parts by weight to 450 parts by weight with respect to 100 parts by weight of the alkali-soluble resin, and the second monomer mixture may be added in an amount of 30 parts by weight to 350 parts by weight with respect to 100 parts by weight of the alkali-soluble resin.

Other details about the embodiments of the present invention are included in the detailed description and the appended drawings.

Advantageous Effects

As described above, the emulsion particle and the emulsion according to the embodiments of the present invention can attain the improvement in both film properties and durability that have been difficult to be compatible with each other in the prior art.

Further, according to the method of manufacturing an emulsion according to the embodiment of the present invention, an emulsion particle and an emulsion having both improved film properties and durability that have been difficult to be compatible with each other in the prior art can be manufactured.

The effects of the present invention are not limited by the foregoing, and other various effects are included in the present specification.

Background Art

As a method of protecting the surface of a substrate such as paper, film, wood, or metal, a method of coating the surface of the substrate with an oil-based resin may be exemplified. The oil-based resin includes an oil-based organic solvent as a solvent for improving the workability of a coating process and improving coating properties. However, the oil-based resin is vulnerable to fire because it is flammable, and the oil-based organic solvent remaining on the surface of a coating film may have harmful effects on the human body.

Thus, it is required to develop new coating materials having excellent coating properties with respect to a substrate and excellent durability without flammability and toxicity. In view of the above, a method of using a water-based resin as a coating material can be considered.

DETAILED DESCRIPTION

Modes of the Invention

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

As used herein, the term "and/or" includes any and all combinations of one or more of the associated listed items. The numerical range indicated by using "to" represents a numerical range including the values described therebefore and thereafter as a lower limit and an upper limit, respectively. The term "about" or "approximately" means a value or numerical range within 20% of the value or numerical range described thereafter.

As used herein, the term "alkali-soluble" means that at least 10 g of a resin or a polymer is soluble in 1 L of deionized water of pH 7 or more at room temperature.

As used herein, the term "emulsion" refers to a system in which emulsion particles insoluble in a dispersion medium are dispersed in a dispersion medium. The term "emulsion particle" refers to a particulate polymer manufactured by emulsion polymerization and including latex particles.

As used herein, the term "alkyl group" refers to a monovalent atomic group obtained by excluding one hydrogen atom from a linear or branched aliphatic saturated hydrocarbon, and is represented by "*—$C_nH_{2n+1}$ (here, n is a natural number)". "*" refers to a bonding site at which adjacent atoms are covalently bonded.

Hereinafter, an emulsion, an emulsion particle, and a method of manufacturing an emulsion according to exemplary embodiments of the present invention will be described in detail.

Emulsion and Emulsion Particle

An emulsion according to an exemplary embodiment of the present invention includes a dispersion medium and emulsion particles dispersed in the dispersion medium. For example, the content of the emulsion particles may be about 60 wt % or less with respect to the total weight of the emulsion.

Figure 1:
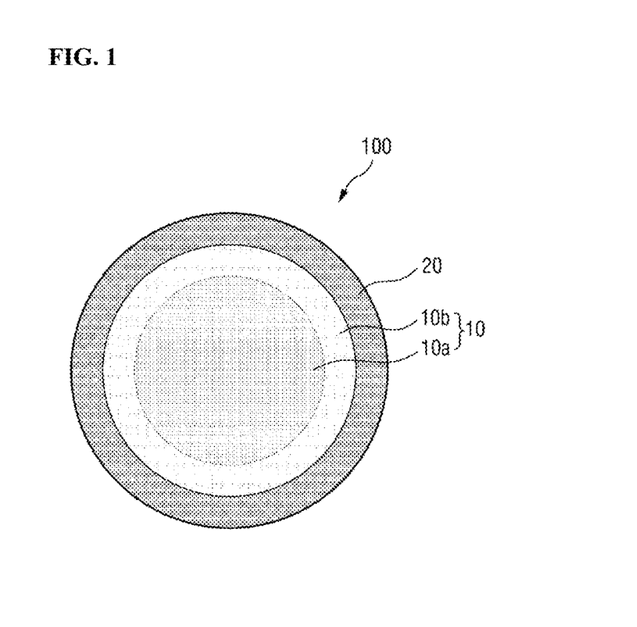
FIG. 1 is a schematic view for explaining the structure of an emulsion particle according to an embodiment of the present invention.

FIG. 1 is a schematic view for explaining the structure of an emulsion particle 100 according to an embodiment of the present invention. Referring to FIG. 1, the emulsion particle 100 according to this embodiment may have a core-shell structure at least partially. The core 10 may include a polymer matrix, and the shell 20 may surround the core 10 at least partially. For example, the emulsion particle 100 may be manufactured by the emulsion polymerization of monomers using an alkali-soluble resin as an emulsifier.

The shell 20 may include an alkali-soluble resin. In an exemplary embodiment, the weight average molecular weight (Mw) of the alkali-soluble resin constituting the shell 20 may be about 5,000 g/mol to 30,000 g/mol, and the acid value thereof may be about 70 mgKOH/g to 180 mgKOH/g. The glass transition temperature of the alkali water-soluble resin constituting the shell 20 may be about 30° C. to 120° C. or about 55° C. to 100° C.

When the alkali-soluble resin is used as an emulsifier by setting the weight average molecular weight, glass transition temperature and/or acid value of the alkali-soluble resin within the above ranges, the emulsion particle 100 having a narrow unimodal particle size distribution while having an average particle size on the order of nanometers can be manufactured. In addition, it is possible to improve the coating properties of the manufactured emulsion and to impart sufficient durability to this emulsion. For example, when the alkali-soluble resin constituting the shell 20 is configured to have a relatively high acid value and glass transition temperature as compared with those of the polymer constituting the core 10, which will be described later, it is possible to enhance the durability such as hardness of a coating film using the emulsion and improve the coating properties such as wettability of the coating film.

The alkali-soluble resin may be manufactured by the free-radical polymerization, for example, continuous bulk polymerization of styrene/acrylic monomers. In an exemplary embodiment, the alkali-soluble resin may be a polymer derived from a monomer mixture including at least one of a (meth)acrylic acid-based monomer and a (meth)acrylic monomer and a styrene-based monomer.

Examples of the styrene-based monomer may include styrene and α-methylstyrene. Examples of the (meth)acrylic acid-based monomer may include methacrylic acid and acrylic acid. Examples of the (meth)acrylic monomer may include methyl acrylate, ethyl acrylate, butyl acrylate, 2-ethylhexyl acrylate, methyl methacrylate, ethyl methacrylate, butyl methacrylate, and 2-ethylhexyl methacrylate.

In some embodiments, the alkali-soluble resin may include a polymer derived from an unsaturated ethylenic monomer having a structure represented by Chemical Formula 1 below.

<Chemical Formula 1>

In Chemical Formula 1 above, $R_1$ is hydrogen or a methyl group (*—$CH_3$), and $R_2$ is a phenyl group or *—C(=O)—$OR_3$ (here, $R_3$ is a linear or branched C1 to C10 alkyl group or hydrogen).

For example, the alkali-soluble resin may be a polymer derived from a monomer mixture including one or more of a styrene-based monomer represented by Chemical Formula 1A below, a (meth)acrylic acid-based monomer represented by Chemical Formula 1B below, and a (meth)acrylic monomer represented by Chemical Formula 1C below.

<Chemical Formula 1A>

<Chemical Formula 1B>

<Chemical Formula 1C>

In Chemical Formulae 1A, 1B, and 1C, $R_1$ is hydrogen or a methyl group (*—$CH_3$), and $R_4$ is a linear or branched C1 to C10 alkyl group.

As a non-limiting example, the alkali-soluble resin may be manufactured by the continuous bulk polymerization of a composition including a monomer mixture including about 5 wt % to 75 wt % of the styrene-based monomer represented by Chemical Formula 1A above, about 10 wt % to 40 wt % of the (meth)acrylic acid-based monomer represented by Chemical Formula 1B above and about 15 wt % to 45 wt % of the (meth)acrylic monomer represented by Chemical Formula 1C above, a polymerization initiator, and a solvent at a temperature of 120° C. to 300° C.

The polymerization initiator is not particularly limited as long as it can be used in the polymerization of styrene/acrylic monomers, and, for example, may be an alkyl peroxybenzoate-based initiator. Further, as the polymerization initiator, a polymerization initiator having a half life of about 10 hours at 90° C. to 120° C. may be used. For example, the polymerization initiator may include t-butyl peroxybenzoate. The polymerization initiator may be contained in an amount of about 0.001 part by weight to 2 parts by weight with respect to 100 parts by weight of the monomer mixture.

The solvent may include dipropylene glycol methyl ether and water. When a mixed solvent of dipropylene glycol methyl ether and water is used as the solvent, the reaction, for example, an esterification reaction between the solvent and the resin can be suppressed, and thus the viscosity of the alkali-soluble resin and/or the temperature in a reactor can be easily controlled. The solvent may be contained in an amount of about 3 parts by weight to 20 parts by weight with respect to 100 parts by weight of the monomer mixture.

The core 10 may include a polymer matrix derived from an unsaturated ethylenic monomer. The polymer derived from an unsaturated ethylenic monomer may be formed by the polymerization of monomers surrounded by an emulsifier during an emulsion polymerization reaction.

In an exemplary embodiment, the core 10 may be a polymer derived from a monomer mixture including a (meth) acrylic monomer, a (meth)acrylic acid-based monomer, a styrene-based monomer, and/or a silane-based monomer, each of which is a monofunctional or bifunctional monomer.

Examples of the styrene-based monomer may include styrene and α-methylstyrene. Examples of the (meth)acrylic acid-based monomer may include methacrylic acid and acrylic acid. Examples of the (meth)acrylic monomer may include methyl acrylate, ethyl acrylate, butyl acrylate, 2-ethylhexyl acrylate, glycidyl acrylate, hexanediol acrylate, hexanediol diacrylate, trimethylolpropane triacrylate, methyl methacrylate, ethyl methacrylate, butyl methacrylate, 2-ethylhexyl methacrylate, glycidyl methacrylate, hexanediol methacrylate, hexanediol dimethacrylate, and trimethylolpropane trimethacrylate. Examples of the silane-based monomer may include glycidoxypropylmethyldimethoxysilane, glycidoxypropyltridiethoxysilane, glycidoxypropylethoxysilane, methacryloxypropylmethyldiethoxysilane, and methacryloxypropyltriethoxysilane.

In some embodiments, the core 10 may include a polymer derived from an unsaturated ethylenic monomer having a structure represented by Chemical Formula 2 below.

<Chemical Formula 2>

In Chemical Formula 2 above, $R_1$ is hydrogen or a methyl group (*—$CH_3$), and $R_5$ is a phenyl group or *—C(=O)—$OR_6$ (here, $R_6$ is a linear or branched C1 to C10 alkyl group, a cyclic C1 to C10 hydrocarbon group, or hydrogen).

For example, the core 10 may be a polymer derived from a monomer mixture including one or more of a styrene-based monomer represented by Chemical Formula 2A below, a (meth)acrylic acid-based monomer represented by Chemical Formula 2B below, and a (meth)acrylic monomer represented by Chemical Formula 2C below.

<Chemical Formula 2A>

<Chemical Formula 2B>

<Chemical Formula 2C>

In Chemical Formulae 2A, 2B and 2C, $R_1$ is hydrogen or a methyl group (*—$CH_3$), and $R_7$ is a linear or branched C1 to C10 alkyl group or a cyclic C1 to C10 hydrocarbon group.

In an exemplary embodiment, the core 10 includes a first sub core 10a located at the center of the core 10 and a second sub core 10b at least partially surrounding the first sub core 10a. That is, the core 10 may have a split structure.

The polymer derived from an unsaturated ethylenic monomer, constituting the first sub core 10a, may be different from the polymer derived from an unsaturated ethylenic monomer, constituting the second sub core 10b.

For example, the first sub core 10a may include a polymer having a first glass transition temperature, and the second sub core 10b may include a polymer having a second glass transition temperature lower than the first glass transition temperature. The first glass transition temperature of the polymer constituting the first sub core 10a may be about 55° C. to 100° C. or about 55° C. to 75° C. Further, the second glass transition temperature of the polymer constituting the second sub core 10b may be about −60° C. to −10° C. or about −55° C. to −30° C. Further, the glass transition temperature (third glass transition temperature) of the alkali-soluble resin constituting the shell 20 may be higher than the second glass transition temperature of the polymer constituting the second sub core 10b.

In some embodiments, the degree of cross-linking of the polymer constituting the first sub-core 10a may be lower than the degree of cross-linking of the polymer constituting the second sub-core 10b. For example, the polymer constituting the first sub-core 10a may have a degree of cross-linking of an equivalent ratio of about 20% or less or a degree of cross-linking of an equivalent ratio of about 5% or less. When the degree of cross-linking of the first sub core 10a is within the range of an equivalent ratio of about 5% or less, it is possible to maximize the film properties and flexibility of an emulsion including the emulsion particles 100 while securing polymerization stability. Further, the polymer constituting the second sub-core 10b may have a degree of cross-linking of an equivalent ratio of about 20% or less or a degree of cross-linking of an equivalent ratio of about 15% or less. In the emulsion according to this embodiment, when the degree of cross-linking of the second sub core 10b formed outside the first sub core 10a is set to be higher than the degree of cross-linking of the first sub core 10a, it is possible to maximize the hardness and durability of the emulsion including the emulsion particles 100 while minimizing the deterioration of film properties of the emulsion. As used herein, the "equivalent ratio" representing the degree of cross-linking refers to the product of the number of moles of polyfunctional monomers and the number of functional groups with respect to the monomer mixture constituting the polymer.

Meanwhile, the weight ratio of the polymer constituting the first sub core 10a and the polymer constituting the second sub core 10b may be about 50:50 to 80:20 or about 65:35 to 75:25.

In the emulsion particle 100 according to this embodiment, the core 10 is formed to have a multilayer structure including the first sub core 10a and the second sub core 10b, thereby realizing uniform and stable emulsion properties. In addition, since the physical properties realized by the first sub-core 10a and the second sub-core 10b are complementary to each other, the physical properties such as film properties, flexibility, hardness and chemical resistance of the emulsion including the emulsion particles 100 can be simultaneously improved, and, when the emulsion containing the alkali-soluble resin as the shell 20 is used as a coating film, the coating film is excellent in appearance and gloss.

For example, since the entire core 10 is sufficiently cross-linked by the second sub core 10b having a relatively high degree of cross-linking, durability such as hardness, scratch resistance or chemical resistance can be improved, and the glass transition temperature of the emulsion including the emulsion particles 100 each containing the second sub core 10b having the second glass transition temperature equal to or lower than room temperature can be maintained relatively low to improve film properties. Accordingly, the minimum film forming temperature can be lowered, so that the content of a film forming agent can be minimized, and the solid content can be designed relatively freely from the requirements for the regulation of volatile organic compounds (VOC).

The glass transition temperature of the emulsion including the emulsion particles 100 according to this embodiment may be about 25° C. to 55° C. or about 35° C. to 45° C. Further, the acid value of the emulsion may be about 100 mgKOH/g or less. When the glass transition temperature of the emulsion is maintained relatively low, grit and/or scale can be lowered, and polymerization stability can be secured.

Figure 2:
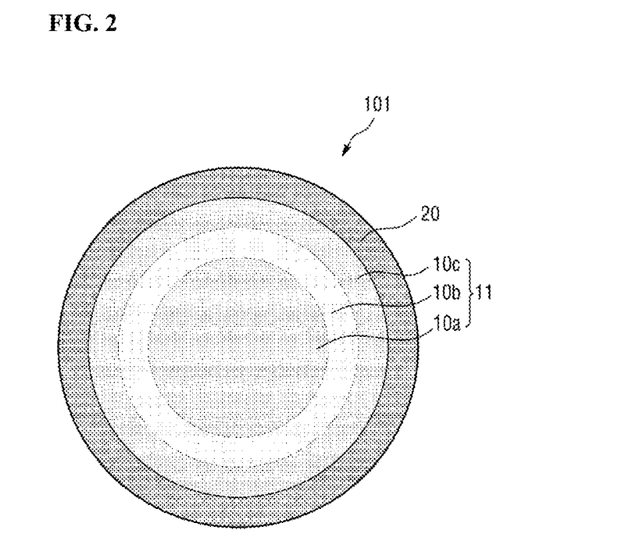
FIG. 2 is a schematic view for explaining the structure of an emulsion particle according to another embodiment of the present invention.

FIG. 2 is a schematic view for explaining the structure of an emulsion particle 101 according to another embodiment of the present invention. Referring to FIG. 2, the emulsion particle 101 according to this embodiment is different from the emulsion particle 100 of FIG. 1 in that it further includes a third sub core 10c surrounding the second sub core 10b at least partially.

Similarly to the first sub core 10a and the second sub core 10b, the third sub core 10c may include a polymer matrix derived from an unsaturated ethylenic monomer. The polymer derived from an unsaturated ethylenic monomer, constituting the third sub core 10c, may be different from the polymer derived from an unsaturated ethylenic monomer, constituting the second sub core 10b.

For example, the third sub core 10c may include a polymer having a fourth glass transition temperature, and the fourth glass transition temperature of the polymer constituting the third sub core 10c may be higher than the second glass transition temperature of the polymer constituting the second sub core 10b. The fourth glass transition temperature of the polymer constituting the third sub core 10c may be about 55° C. to 100° C. or about 55° C. to 75° C. The polymer constituting the third sub core 10c may be the same as or different from the polymer constituting the first sub core 10a.

The glass transition temperature of the emulsion including the emulsion particles 101 according to this embodiment may be about 25° C. to 55° C. Further, the acid value of the emulsion may be about 100 mgKOH/g or less.

Method of Manufacturing Emulsion

A method of manufacturing an emulsion according to an embodiment of the present invention includes the steps of: preparing an alkaline aqueous medium in which an alkali-soluble resin is dissolved; adding a first monomer mixture to the alkaline aqueous medium; and adding a second monomer mixture, whose composition is different from a composition of the first monomer mixture, to the alkaline aqueous medium provided with the first monomer mixture. Each of the first monomer mixture and the second monomer mixture may include an unsaturated ethylenic monomer.

The continuous phase used for emulsion polymerization, that is, a dispersion medium, may be an aqueous medium having basicity. For example, the alkaline aqueous medium may include ammonia, potassium hydroxide and/or sodium hydroxide dissolved in water such as deionized water. The pH of the alkaline aqueous medium may be controlled in consideration of intrinsic properties such as the viscosity and odor of the emulsion and required properties of the emulsion such as film properties, durability, and dispersibility. The step of preparing an alkaline aqueous medium in which an alkali-soluble resin is dissolved may include a step of dispersing an alkali-soluble resin in an aqueous medium and then adding an alkaline material/medium or a step of directly dissolving an alkali-soluble resin in an alkaline aqueous medium.

In an exemplary embodiment, the weight average molecular weight (Mw) of the alkali-soluble resin may be about 5,000 g/mol to 30,000 g/mol, and the acid value thereof is about 70 mgKOH/g to 180 mgKOH/g. Further, the glass transition temperature thereof may be about 30° C. to 120° C. or about 55° C. to 100° C.

The alkali-soluble resin added to the alkaline aqueous medium can perform a function similar to that of an anionic emulsifier. The alkali-soluble resin may be dissolved in the alkaline aqueous medium to form a micelle, and the first monomer mixture and second monomer mixture, which will be described later, may be polymerized in a state of being surrounded by the micelle. Further, as described above, since the alkali-soluble resin having the controlled weight average molecular weight, glass transition temperature and acid value is used as an emulsifier, the emulsion particles may have a narrow unimodal particle size distribution while having an average particle size on the order of nanometers. Moreover, since a separate anionic or nonionic emulsifier other than the alkali-soluble resin is not used, an emulsion having excellent storage stability and excellent transparency can be manufactured.

The alkali-soluble resin may be added in an amount of about 15 wt % to 60 wt % with respect to the total content of solids added to the alkaline aqueous medium, that is, the total content of the alkali-soluble resin, the first monomer mixture, the second monomer mixture and the initiator. When the content of the added alkali-soluble resin is less than 15 wt %, sufficient stability cannot be imparted to the emulsion particles, and the gelation of the emulsion can proceed. Further, the content thereof is more than 60 wt %, durability such as water resistance and alcohol resistance of a coating film using the emulsion may be deteriorated.

Subsequently, the alkaline aqueous medium, to which the alkali-soluble resin was added, may be heated, and an initiator may be added thereto. The step of heating the alkaline aqueous medium may be a step of resetting the temperature of a reaction system in accordance with the reaction temperature of emulsion polymerization. For example, the alkaline aqueous medium may be heated to a temperature of about 70° C. to about 90° C. The initiator may be added at one time before the start of a reaction or may be added continuously or semi-continuously, in consideration of the stability and reactivity of polymerization. For example, the initiator may be continuously added for about 60 minutes to 180 minutes. Examples of the initiator used in the emulsion polymerization may include persulfate-based initiators such as ammonium persulfate, potassium persulfate, and sodium persulfate.

After the step of adding the initiator is started, the step of adding the first monomer mixture and the step of adding the second monomer mixture may be performed. For example, the first monomer mixture may be added after about 5 minutes to 15 minutes has passed since the start of the continuous addition of the initiator. The first monomer mixture and the second monomer mixture may be continuously added in consideration of the stability of the polymerization and the degree of splitting of the core.

In an exemplary embodiment, the first monomer mixture may be continuously added for about 60 minutes to 180 minutes after starting the step of adding the initiator. When the first monomer mixture is added after a reaction system is set to a polymerizable state due to the addition of the initiator, the core of the emulsion particle, specifically, the first sub-core of the emulsion particle, may be formed in a state in which the first monomer mixture is surrounded by the micelle formed by the alkali-soluble resin dissolved in the aqueous medium.

After the step of adding the first monomer mixture is completed, the second monomer mixture may be continuously added for about 60 minutes to 180 minutes. The step of adding the second monomer mixture may be performed immediately after completing the step of adding the first monomer mixture, or may be performed at a time difference of about 1 minute to 30 minutes after completing the step of adding the first monomer mixture. When the step of adding the second monomer mixture may be performed immediately after completing the step of adding the first monomer mixture, more stable polymerization is possible. When the second monomer mixture is added after the polymerization of the first monomer mixture is at least partially started and completed due to addition of the first monomer mixture, the second sub core partially surrounding the core of the emulsion particle, specifically, the first sub core formed by polymerizing the first monomer mixture, may be formed in a state where the second monomer mixture is enclosed in the micelle. Thus, an emulsion particle having a split structure of a core and a shell, and an emulsion including the emulsion particles can be manufactured.

Hereinafter, an emulsion particle, an emulsion including the emulsion particles, and a method of manufacturing the emulsion according to exemplary embodiments of the present invention will be described in more detail with reference to Preparation Examples, Comparative Examples and Experimental Examples.

Preparation Example 1: Preparation of Alkali-Soluble Resin

Preparation Example 1-1

100 g of a monomer mixture including 32.7 g of styrene, 11.5 g of acrylic acid, 52.3 g of methyl methacrylate, and 3.5 g of ethyl acrylate was prepared. 0.10 g of t-butyl peroxybenzoate and 4.5 g of a mixed solvent (dipropylene glycol methyl ether 71 wt %, water 29 wt %) were added to the monomer mixture, and then continuous bulk polymerization was carried out at a temperature of 215° C. using a 1 L SUS reactor to prepare a styerene/acrylic resin.

The weight average molecular weight of the resin prepared in Preparation Example 1-1 was 10,639 g/mol, the glass transition temperature thereof was 95° C., and the acid value thereof was 85.9 mgKOH/g.

Preparation Example 1-2

100 g of a monomer mixture including 31.0 g of styrene, 12.0 g of methacrylic acid, 2.5 g of acrylic acid, 49.3 g of methyl methacrylate, and 5.2 g of ethyl acrylate was prepared. 0.14 g of t-butyl peroxybenzoate and 4.5 g of a mixed solvent (dipropylene glycol methyl ether 75 wt %, water 25 wt %) were added to the monomer mixture, and then continuous bulk polymerization was carried out at a temperature of 219° C. using a 1 L SUS reactor to prepare a styerene/acrylic resin.

The weight average molecular weight of the resin prepared in Preparation Example 1-2 was 11,528 g/mol, the glass transition temperature thereof was 103° C., and the acid value thereof was 94.5 mgKOH/g.

Preparation Example 2: Preparation of Emulsion

Preparation Example 2-1

411.3 g of a first monomer mixture including 334.5 g of styrene, 64.5 g of methyl methacrylate, and 12.3 g of glycidyl methacrylate was prepared (weight ratio 81.3:15.7:3.0). Further, 405.6 g of a second monomer mixture including 330.0 g of ethylhexyl acrylate, 63.6 g of methyl methacrylate, and 12.0 g of glycidyl methacrylate was prepared (weight ratio 81.3:15.7:3.0). 370 g of the styerene/acrylic resin obtained in Preparation Example 1-1 and 1,320 g of water was put into a 5 L SUS reactor, 48 g of an aqueous ammonia solution was added while stirring to dissolve the resin, and then ammonium persulfate was continuously added for 120 minutes while heating to 76.0° C. After 10 minutes have passed since the beginning of the addition of ammonium persulfate, 411.3 g of the first monomer mixture was continuously added at a flow rate of 4.6 g/min for about 90 minutes. Immediately after the addition of the first monomer mixture was completed, 405.6 g of the second monomer mixture was continuously added at a flow rate of 4.6 g/min to prepare an emulsion. The weight ratio of the first monomer mixture and the second monomer mixture was 50.3:49.7.

Preparation Example 2-2

An emulsion was prepared in the same manner as in Preparation Example 2-1, in which the first monomer mixture and the second monomer mixture were prepared in the same manner, except that 470.7 g of the first monomer mixture and 286.5 g of the second monomer mixture were sequentially added. The weight ratio of the first monomer mixture and the second monomer mixture was 57.6:42.4.

Preparation Example 2-3

An emulsion was prepared in the same manner as in Preparation Example 2-1, in which the first monomer mixture and the second monomer mixture were prepared in the same manner, except that 530.4 g of the first monomer mixture and 286.5 g of the second monomer mixture were sequentially added. The weight ratio of the first monomer mixture and the second monomer mixture was 64.9:35.1.

Preparation Example 2-4

An emulsion was prepared in the same manner as in Preparation Example 2-1, in which the first monomer mixture and the second monomer mixture were prepared in the same manner, except that 559.2 g of the first monomer mixture and 257.7 g of the second monomer mixture were sequentially added. The weight ratio of the first monomer mixture and the second monomer mixture was 68.5:31.5.

Preparation Example 2-5

657.0 g of a first monomer mixture including 551.1 g of styrene and 105.9 g of methyl methacrylate was prepared. Further, 292.8 g of a second monomer mixture including 238.5 g of ethylhexyl acrylate, 45.9 g of methyl methacrylate, and 8.4 g of glycidyl methacrylate was prepared. 264 g of the styrene/acrylic resin obtained in Preparation Example 1-2 and 1,200 g of water was put into a 5 L SUS reactor, 30 g of an aqueous ammonia solution was added while stirring to dissolve the resin, and then ammonium persulfate was continuously added for 150 minutes while heating to 80.0° C. After 10 minutes have passed since the beginning of the addition of ammonium persulfate, 657.0 g of the first monomer mixture was continuously added at a flow rate of 6.5 g/min for about 100 minutes. Immediately after the addition of the first monomer mixture was completed, 292.8 g of the second monomer mixture was continuously added at a flow rate of 6.5 g/min to prepare an emulsion. The weight ratio of the first monomer mixture and the second monomer mixture was 69.2:30.8.

Preparation Example 2-6

An emulsion was prepared in the same manner as in Preparation Example 2-5, except that a first monomer mixture including 545.5 g of styrene, 105.0 g of methyl methacrylate, and 6.6 g of glycidyl methacrylate was used.

Preparation Example 2-7

An emulsion was prepared in the same manner as in Preparation Example 2-5, except that a first monomer mixture including 534.6 g of styrene, 102.9 g of methyl methacrylate, and 19.5 g of glycidyl methacrylate was used.

Preparation Example 2-8

An emulsion was prepared in the same manner as in Preparation Example 2-5, except that a first monomer mixture including 516.0 g of styrene, 99.0 g of methyl methacrylate, and 21.9 g of ethylhexyl acrylate was used.

Preparation Example 2-9

An emulsion was prepared in the same manner as in Preparation Example 2-5, except that a first monomer mixture including 497.1 g of styrene, 95.4 g of methyl methacrylate, and 44.4 g of ethylhexyl acrylate was used.

Preparation Example 2-10

An emulsion was prepared in the same manner as in Preparation Example 2-5, except that a first monomer mixture including 477.6 g of styrene, 91.8 g of methyl methacrylate, and 67.5 g of ethylhexyl acrylate was used.

Preparation Example 2-11

An emulsion was prepared in the same manner as in Preparation Example 2-5, except that a first monomer mixture including 458.1 g of styrene, 87.9 g of methyl methacrylate, and 90.9 g of ethylhexyl acrylate was used.

Preparation Example 2-12

An emulsion was prepared in the same manner as in Preparation Example 2-5, except that a second monomer mixture including 238.5 g of ethylhexyl acrylate, 45.9 g of methyl methacrylate, and 13.8 g of glycidyl methacrylate was used.

Preparation Example 2-13

An emulsion was prepared in the same manner as in Preparation Example 2-5, except that a second monomer mixture including 235.0 g of ethylhexyl acrylate, 45.2 g of methyl methacrylate, 8.4 g of glycidyl methacrylate, and 4.2 g of hexanediol acrylate was used.

Comparative Example 1

370 g of the styrene/acrylic resin obtained in Preparation Example 1-1 and 1,250 g of water was put into a 5 L SUS reactor, 48 g of an aqueous ammonia solution was added while stirring to dissolve the resin, and then ammonium persulfate was continuously added for 120 minutes while heating to 76.0° C. After 10 minutes have passed since the beginning of the addition of ammonium persulfate, 861.9 g of a monomer mixture including 427.0 g of styrene, 142.4 g of methyl methacrylate, and 292.5 g of ethylhexyl acrylate (weight ratio 48.3:16.2:35.5) was added at a flow rate of 5.7 g/min to prepare an emulsion.

Comparative Example 2

An emulsion was prepared in the same manner as in Comparative Example 1, except that 861.9 g of a monomer mixture including 422.7 g of styrene, 141.0 g of methyl methacrylate, 289.4 g of ethylhexyl acrylate, and 8.7 g of glycidyl methacrylate (weight ratio 49.0:16.4:33.6:1.0) was used.

Comparative Example 3

An emulsion was prepared in the same manner as in Comparative Example 1, except that 861.9 g of a monomer mixture including 417.3 g of styrene, 139.2 g of methyl methacrylate, 288.1 g of ethylhexyl acrylate, and 17.3 g of glycidyl methacrylate (weight ratio 48.4:16.2:33.4:2.0) was used.

Comparative Example 4

An emulsion was prepared in the same manner as in Comparative Example 1, except that 861.9 g of a monomer mixture including 413.1 g of styrene, 137.7 g of methyl methacrylate, 285.8 g of ethylhexyl acrylate, and 26.1 g of glycidyl methacrylate (weight ratio 47.9:16.0:33.1:3.0) was used.

EXPERIMENTAL EXAMPLES

Experimental Example 1: Measurement of Grit Content

Each of the emulsions prepared according to Preparation Examples 2-1 to 2-13 and Comparative Examples 1 to 4 was filtered by a 300 mesh sieve, and the weight of the particles obtained by sieving was measured and converted. The results thereof are shown in Table 1.

Experimental Example 2: Measurement of Particle Size

The average particle size and particle size distribution of the emulsion particles contained in each of the emulsions prepared according to Preparation Examples 2-1 to 2-13 and Comparative Examples 1 to 4 were measured using a particle size analyzer (Model: Microtrac TM 150). The Results Thereof are Shown in Table 1.

Experimental Example 3: Measurement of Glass Transition Temperature

The glass transition temperature of each of the emulsions prepared according to Preparation Examples 2-1 to 2-13 and Comparative Examples 1 to 4 was measured using differential scanning calorimetry. The results thereof are shown in Table 1. During the measurement, the temperature range was −50° C. to 200° C., and the temperature increase rate was 10° C./min.

Experimental Example 4: Measurement of Minimum Amount of Film-Forming Agent

Figure 3:
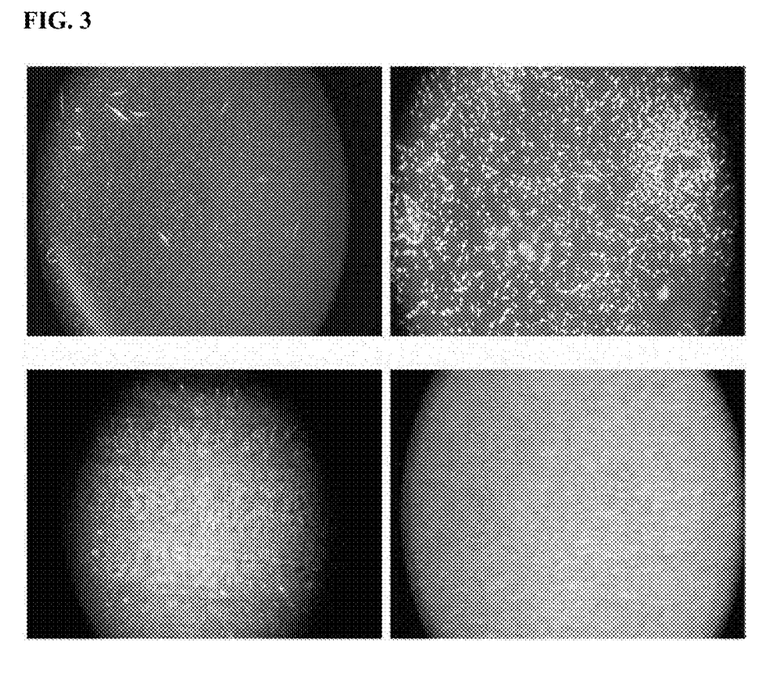
FIG. 3 shows images of a coating film according to Experimental Example 4 using Comparative Example 2.

A film-forming agent (DPM/DPnB=1/1) was mixed with 100 g of each of the emulsions prepared according to Preparation Examples 2-1 to 2-13 and Comparative Examples 1 to 4, and an opaque paper was coated with this mixture to form a coating film (thickness of wet coating film: 50 μm) and then the coating film was dried at a temperature of 25° C. Under these conditions, the minimum amount (parts by weight) of the film-forming agent required to form the coating film without occurrence of cracks was measured. The results thereof are shown in Table 2. In Experimental Example 4, the lower the minimum amount of the film forming agent, the better the film properties. Images of the coating film according to Experimental Example 4 using Comparative Example 2 are shown in FIG. 3.

Experimental Example 5: Measurement of Flexibility

An metal plate substrate having a thickness of 0.3 T was coated with each of the emulsions prepared according to Preparation Examples 2-1 to 2-13 and Comparative Examples 1 to 4 to form a coating film (thickness of wet coating film: 100 μm), and then the coating film was dried at a temperature of 50° C. for 24 hours. The level of cracks occurring in the dried coating film was determined using a flexural tester (model name: cylindrical mandrel tester, QTY-32), and the results thereof are shown in Table 2. In Experimental Example 5, the less cracks in the dried coating film, the better the flexibility of the dried coating film.

Experimental Example 6: Measurement of Hardness

A glass plate substrate was coated with each of the emulsions prepared according to Preparation Examples 2-1 to 2-13 and Comparative Examples 1 to 4 to form a coating film (thickness of wet coating film: 100 μm), and then the coating film was dried at a temperature of 50° C. for 24 hours. The hardness of the coating film was measured using a hardness meter (model: SP-SP0500) and a pencil hardness tester (Model: KP-M500M), and the results thereof are shown in Table 2. In Experimental Example 6, pendulum hardness is higher as the number of counts increases, and pencil hardness is higher in order of 1H>HB>1B>2B.

Experimental Example 7: Measurement of Water Resistance

The minimum amount of a film forming agent (DPM/DPnB=1/1) was mixed with 100 g of each of the emulsions prepared according to Preparation Examples 2-1 to 2-13 and Comparative Examples 1 to 4, and an opaque paper was coated with the mixture to form a coating film (thickness of wet coating film: 50 μm), and then the coating film was dried at a temperature of 100° C. for 1 minute. The minimum amount of the film forming agent was set by referencing the results of Experimental Example 4. Further, water was put into a 30 mL vial, the vial was turned over onto the dried coating film to keep a state where the water and the coating film are in contact with each other for 24 hours, and then water was removed and whether or not the coating film was damaged was determined. The results thereof are shown in Table 2. In Experimental Example 7, water resistance is poor when cloudiness occurs in the coating film.

Experimental Example 8: Measurement of Alcohol Resistance

The minimum amount of a film forming agent (DPM/DPnB=1/1) was mixed with 100 g of each of the emulsions prepared according to Preparation Examples 2-1 to 2-13 and Comparative Examples 1 to 4, and an opaque paper was coated with the mixture to form a coating film (thickness of wet coating film: 50 μm), and then the coating film was dried at a temperature of 100° C. for 1 minute. The minimum amount of the film forming agent was set by referencing the results of Experimental Example 4. Further, a 50% ethanol solution (water:ethanol=1:1) was put into a 30 mL vial, the vial was turned over onto the dried coating film to keep a state where the ethanol solution and the coating film are in contact with each other for 1 hour, and then the ethanol solution was removed and whether or not the coating film was damaged was determined. The results thereof are shown in Table 2. In Experimental Example 8, alcohol resistance is poor when cloudiness occurs in the coating film. Images of the coating film according to Experimental Example 8 using Comparative Example 2 are shown in FIG. 3.

Experimental Example 9

411.3 g of a first monomer mixture including 334.5 g of styrene, 64.5 g of methyl methacrylate, and 12.3 g of glycidyl methacrylate was prepared. Further, 405.6 g of a second monomer mixture including 330.0 g of ethylhexyl acrylate, 63.6 g of methyl methacrylate, and 12.0 g of glycidyl methacrylate was prepared. 370 g of the styrene/acrylic resin obtained in Preparation Example 1-1 was dissolved in 48 g of an aqueous ammonia solution in a 5 L SUS reactor, and then ammonium persulfate was continuously added for 120 minutes while heating to 76.0° C.

Figure 5:
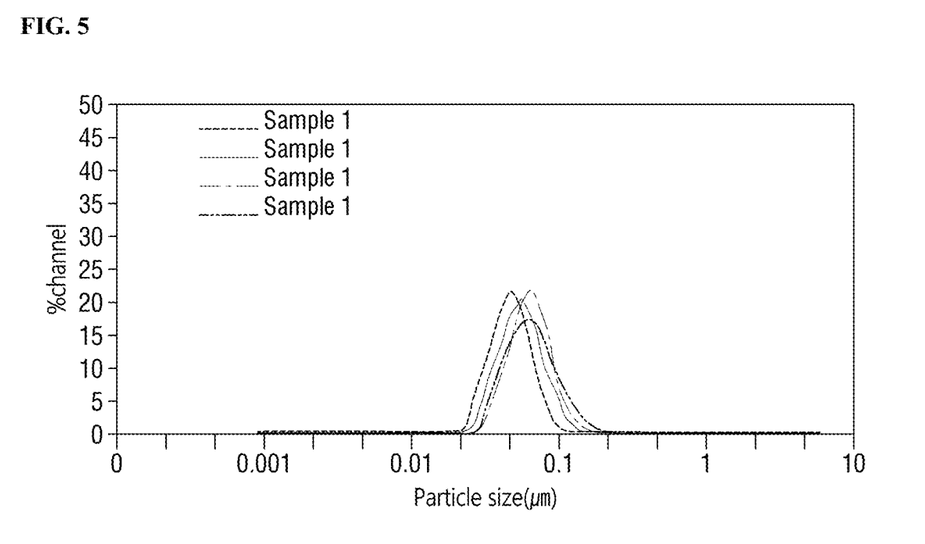
FIG. 5 shows the results of measuring the particle size of the emulsion particles according to Experimental Example 9.

After 10 minutes have passed since the beginning of the addition of ammonium persulfate, 411.3 g of the first monomer mixture was added and polymerized to prepare an emulsion, and a part of the emulsion was sampled, and the particle size of emulsion particles was measured (Sample 1). Then, 405.6 g of the second monomer mixture was introduced into the reactor containing the first monomer mixture to prepare an emulsion, and a part of the emulsion was sampled, and the particle size of emulsion particles was measured (Sample 2). Then, the prepared emulsion was aged for 1 hour, and a part of this emulsion was sampled, and the particle size of emulsion particles was measured (Sample 3). Then, 0.6 g of ammonium persulfate was further added in order to consume unreacted residual monomers, maintained for 30 minutes, and then a reaction was completed. At this time, a part of this emulsion was sampled, and the particle size of emulsion particles was measured. The results thereof are shown in FIG. 5.

TABLE 1

| | Content of solids (wt %) | Viscosity (cps) | pH | Grit (ppm) | Average particle size (nm) | Glass transition temperature (° C.) |
|---|---|---|---|---|---|---|
| Preparation Example 2-1 | 41.2 | 93 | 8.9 | 86 | 72.3 | 30.0 |
| Preparation Example 2-2 | 41.4 | 74 | 8.9 | 122 | 73.8 | 38.3 |
| Preparation Example 2-3 | 41.8 | 106 | 9.0 | 69 | 82.6 | 47.1 |
| Preparation Example 2-4 | 41.8 | 102 | 8.9 | 163 | 74.0 | 51.6 |
| Preparation Example 2-5 | 40.8 | 86 | 9.0 | 16 | 62.3 | 47.1 |
| Preparation Example 2-6 | 41.3 | 64 | 8.9 | 31 | 72.0 | 47.1 |

TABLE 1-continued

| | Content of solids (wt %) | Viscosity (cps) | pH | Grit (ppm) | Average particle size (nm) | Glass transition temperature (° C.) |
|---|---|---|---|---|---|---|
| Preparation Example 2-7 | 41.5 | 74 | 8.8 | 60 | 78.4 | 47.1 |
| Preparation Example 2-8 | 41.8 | 74 | 8.8 | 15 | 66.3 | 40.0 |
| Preparation Example 2-9 | 41.8 | 86 | 8.7 | 259 | 61.9 | 36.0 |
| Preparation Example 2-10 | 41.7 | 134 | 8.7 | 380 | 51.7 | 32.0 |
| Preparation Example 2-11 | 41.8 | 121 | 8.8 | 210 | 56.0 | 28.0 |
| Preparation Example 2-12 | 41.9 | 92 | 8.9 | 16 | 65.5 | 47.1 |
| Preparation Example 2-13 | 41.7 | 108 | 8.7 | 25 | 67.3 | 44.7 |
| Comparative Example 1 | 41.8 | 227 | 8.7 | 360 | 57.8 | 40.1 |
| Comparative Example 2 | 41.6 | 243 | 8.6 | 911 | 62.3 | 40.1 |
| Comparative Example 3 | 41.5 | 186 | 8.6 | 2989 | 45.8 | 40.0 |
| Comparative Example 4 | 41.7 | 154 | 8.7 | 4370 | 62.3 | 40.0 |

TABLE 2

| | Minimum amount of film forming agent (parts by weight) | Flexibility (whether cracks occur) | Pendulum hardness (Count) | Pencil hardness | Water resistance (whether cloudiness occurs) | Alcohol resistance (whether cloudiness occurs) |
|---|---|---|---|---|---|---|
| Preparation Example 2-1 | 4.0 | 0 | 95 | B | 0 | 1 |
| Preparation Example 2-2 | 5.5 | 1 | 124 | 1B | 0 | 1 |
| Preparation Example 2-3 | 7.5 | 2 | 137 | 1B-HB | 0 | 1 |
| Preparation Example 2-4 | 8.5 | 3 | 159 | 1H | 0 | 1 |
| Preparation Example 2-5 | 5.5 | 1 | 145 | HB | 0 | 0 |
| Preparation Example 2-6 | 6.5 | 1 | 143 | HB | 0 | 0 |
| Preparation Example 2-7 | 8.5 | 3 | 142 | HB | 0 | 0 |
| Preparation Example 2-8 | 7.0 | 1 | 155 | HB | 0 | 0 |
| Preparation Example 2-9 | 7.0 | 1 | 133 | HB | 0 | 0 |
| Preparation Example 2-10 | 6.5 | 0 | 122 | 1B-HB | 0 | 0 |
| Preparation Example 2-11 | 6.5 | 0 | 109 | 1B | 0 | 0 |
| Preparation Example 2-12 | 6.5 | 2 | 157 | HB-1H | 0 | 0 |
| Preparation Example 2-13 | 6.5 | 2 | 154 | HB-1H | 0 | 0 |
| Comparative Example 1 | 4.0 | 0 | 84 | 1B | 1 | 3 |
| Comparative Example 2 | 4.5 | 1 | 99 | 1B | 0 | 3 |
| Comparative Example 3 | 5.5 | 2 | 111 | 1B | 0 | 3 |
| Comparative Example 4 | 7.5 | 3 | 118 | 1B-HB | 0 | 2 |

In the flexibility test of Table 2, "0" means that there are no cracks, "1" means that there are few cracks, "2" means that there are even more cracks and "3" means that there are many cracks. That is, the smaller the number, the better the flexibility.

Further, in the water resistance and alcohol resistance tests of Table 2, "0" means that no cloudiness occurs, "1" means that cloudiness slightly occurs, "2" means that slightly more cloudiness occurs, and "3" means that cloudiness frequently occurs. That is, the smaller the number, the better the water resistance and alcohol resistance.

Referring to Tables 1 and 2, it can be ascertained that the emulsions and emulsion particle according to Preparation Examples have generally good basic physical properties and coating properties as compared with the emulsions and emulsion particles according to Comparative Examples. Referring to Comparative Examples, it can be ascertained that film properties and flexibility are remarkably deteriorated when the degree of cross-linking is increased in order to improve durability such as hardness and alcohol resistance. In particular, in the case of Comparative Examples 3 and 4, the content of grits is remarkably increased due to low polymerization stability, and thus grit is distributed on a coating film during coating, so that it is difficult to accurately evaluate coating properties.

Further, it can be ascertained that Preparation Example 2-2 and Preparation Example 2-3 have good film properties and flexibility despite the high glass transition temperature as compared with Comparative Examples. Moreover, it can be ascertained that the hardness and alcohol resistance of Preparation Examples 2-8 to 2-11 are equal to or higher than those of Comparative Examples, despite low glass transition temperature.

Figure 4:
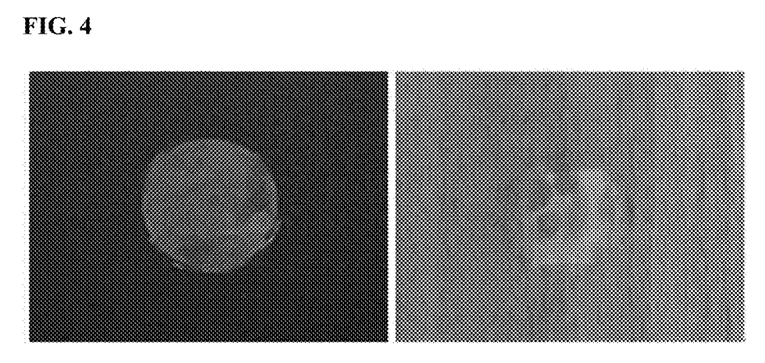
FIG. 4 shows images of a coating film according to Experimental Example 8 using Comparative Example 2.

FIG. 3 shows images of a coating film according to Experimental Example 4 using Comparative Example 2. FIG. 4 shows images of a coating film according to Experimental Example 8 using Comparative Example 2. Referring to FIG. 3, it can be ascertained that in the case of the coating film using the emulsion according to Comparative Example 2, cracks occurred in both a paper substrate (upper) and a wood substrate (lower). Referring to FIG. 4, it can be ascertained that the coating film using the emulsion according to Comparative Example 2 has poor alcohol resistance in both a paper substrate (left) and a wood substrate (right).

FIG. 5 shows the results of measuring the particle size of the emulsion particles according to Experimental Example 9. Referring to FIG. 5, it can be ascertained that the average particle size of sample 2 obtained from the second monomer mixture in addition to the first monomer mixture is larger than that of sample 1 obtained by the emulsion polymerization of only the first monomer mixture. That is, it can be ascertained that the first monomer mixture and the second monomer mixture are sequentially introduced to stably form emulsion particles having a core-split structure. Further, it can be ascertained that the emulsion particles contained in the emulsion prepared in the same manner as in Preparation Example 2-1 have a unimodal particle distribution.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

It is claimed:

1. An emulsion particle, comprising:
   a core derived from a polymer of an unsaturated ethylenic monomer and including a first sub core and a second core surrounding the first sub core,
   a shell surrounding the core and including an alkali-soluble resin,
   wherein the first sub core includes a polymer having a first glass transition temperature,
   the second sub core includes a polymer having a second glass transition temperature lower than the first glass transition temperature,
   wherein the polymer constituting the first sub core comprises a first monomer mixture including 80 wt % to 85 wt % of styrene and 13 wt % to 17 wt % of methyl methacrylate, with respect to a total weight of the first monomer mixture,
   wherein the polymer constituting the second sub core comprises a second monomer mixture including 80 wt % to 85 wt % of ethylhexyl acrylate, 13 wt % to 17 wt % of methyl methacrylate, and 1.0 wt % to 5.0 wt % of glycidyl methacrylate, with respect to a total weight of the second monomer mixture,
   wherein the alkali-soluble resin constituting the shell is a polymer derived from a monomer mixture including a styrene, a (meth)acrylate, and an ethyl acrylate or a methyl methacrylate, and
   the degree of cross-linking of the polymer constituting the first sub core is lower than the degree of cross-linking of the polymer constituting the second sub core, wherein the polymer constituting the first sub core has a degree of cross-linking of an equivalent ratio of about 20% or less.

2. The emulsion particle of claim 1,
   wherein the alkali-soluble resin constituting the shell has a third glass transition temperature.

3. The emulsion particle of claim 2,
   wherein the first glass transition temperature is 55° C. to 100° C., and
   the second glass transition temperature is −60° C. to −10° C.

4. The emulsion particle of claim 2,
   wherein a weight ratio of the polymer constituting the first sub core and the polymer constituting the second sub core is 50:50 to 80:20.

5. The emulsion particle of claim 2,
   wherein the core further includes a third sub core surrounding the second sub core, and
   the third sub core includes a polymer having a fourth glass transition temperature higher than the second glass transition temperature.

6. The emulsion particle of claim 5,
   wherein the fourth glass transition temperature is 55° C. to 100° C.

* * * * *